Oct. 3, 1967   O. H. TAGGART   3,344,553
MINIATURE RACING CAR
Filed Aug. 13, 1965   2 Sheets-Sheet 1

INVENTOR.
OWEN H. TAGGART,
BY
Berman, Davidson & Berman
ATTORNEYS.

Oct. 3, 1967  O. H. TAGGART  3,344,553
MINIATURE RACING CAR
Filed Aug. 13, 1965  2 Sheets-Sheet 2
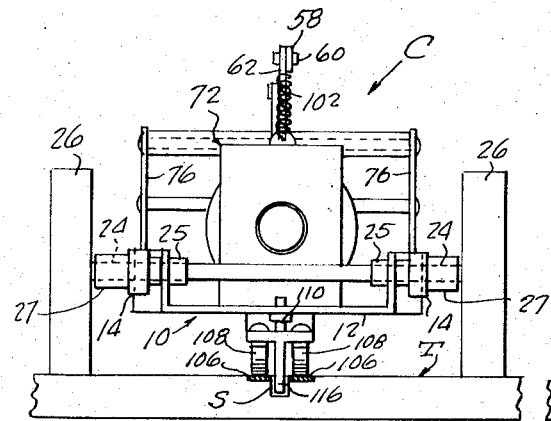
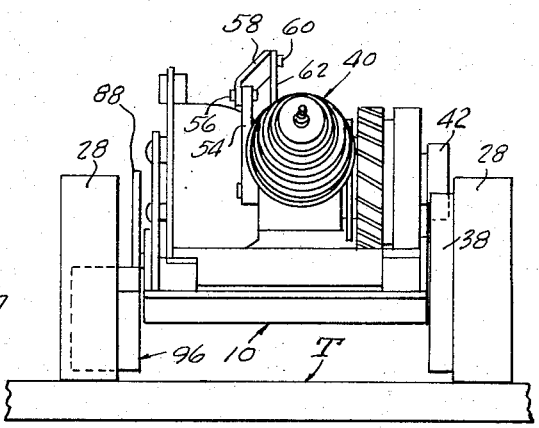
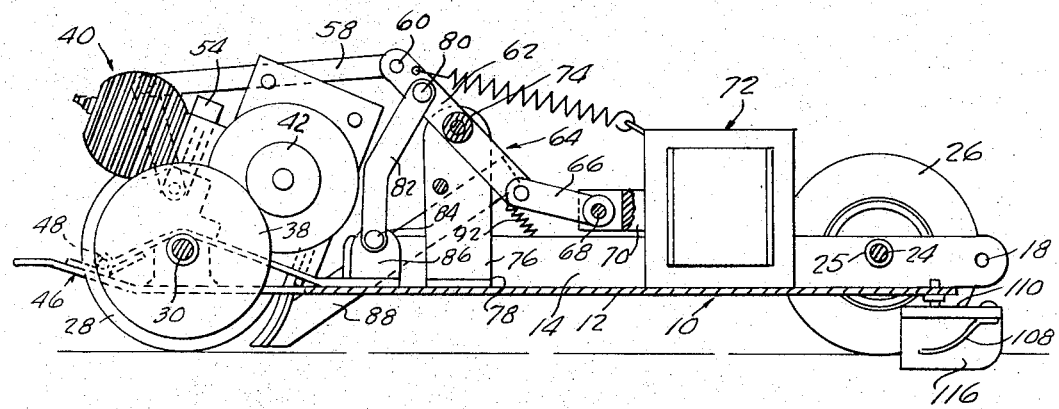
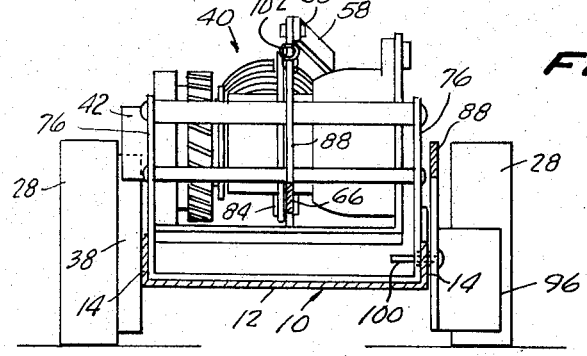
INVENTOR.
OWEN H. TAGGART,
BY
Berman, Davidson & Berman
ATTORNEYS.

United States Patent Office 3,344,553
Patented Oct. 3, 1967

3,344,553
MINIATURE RACING CAR
Owen H. Taggart, 6815 E. Mary Drive,
Tucson, Ariz. 85710
Filed Aug. 13, 1965, Ser. No. 479,444
8 Claims. (Cl. 46—45)

This invention relates to a miniature remote controlled, gas engine driven, slot racing car.

Another object of the invention is the provision of a more efficient, more completely controllable car of the kind indicated, the control of which lends greater realism to miniature car slot racing.

Another object of the invention is the provision of a car of the character indicated above, having spring actuated brake means which is adapted to be controlled and released by electrical means mounted on the car, electric current for operation of the electrical means being provided by the engagement of contactor means on the car, with conductive means present on the miniature car racing track, along the guide slot thereof, the current so supplied through the closure of external switch means, adapted to be operated to stop, start, and control the speed of the car.

In the drawings:

FIGURE 3 is a front end elevation of FIGURE 2;

FIGURE 4 is a rear end elevation of FIGURE 2;

FIGURE 5 is a vertical longitudinal section taken through the car, showing the brake in released position, and the motor in drive-engaged position; and, FIGURE 6 is a vertical transverse section taken on the line 6—6 of FIGURE 2.

Referring in detail to the drawings, the illustrated car C is shown disposed upon a miniature track T, formed, in its upper surface, with a longitudinal guide slot S.

Figure 1:
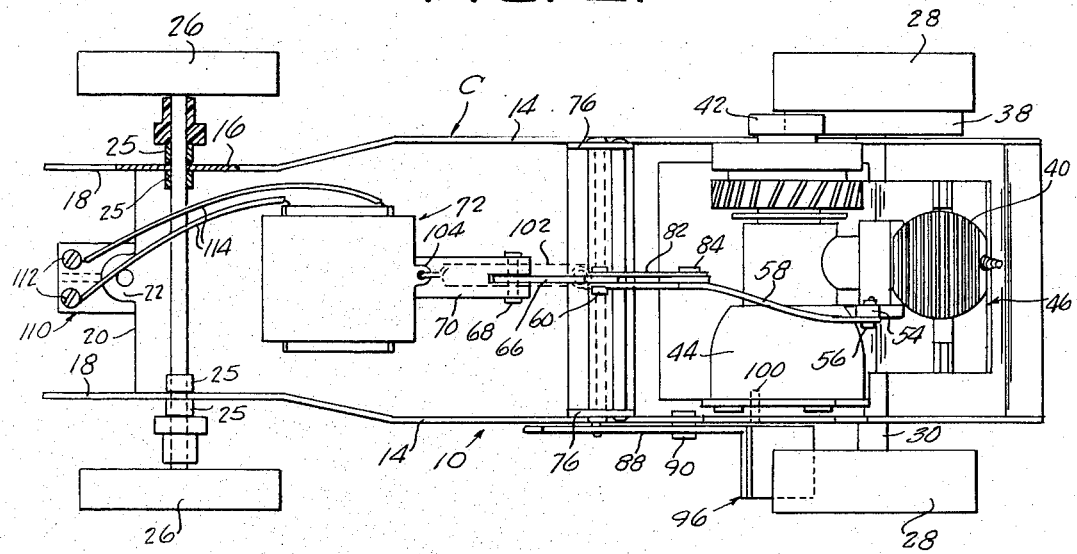
FIGURE 1 is a top plan view of a car of the invention.

The car C comprises a horizontally and longitudinally elongated chassis 10, in the form of an upwardly opening channel, having a horizontal bottom wall 12, and upstanding side walls 14. As shown in FIGURE 1, the forward end portion 16 of the chassis 10 is preferably of reduced width, and the side walls 14 have protective extensions 18 which reach forwardly beyond the forward end 20 of the bottom wall 12 for the purpose of mounting a snap-on plastic body (not shown). A pivot guide eye 22 is provided on said forward end 20.

A front axle 24 is suitably secured through the sides 14 of the chassis 10, at the forward end portion 16 as by means of brass bushings 25, and has out-riding track-engaging front wheels 26 thereon, plastic spacers 27 being interposed between the wheels 26 and the outer bushings 25. Out-riding rear track engaging drive wheels 28 are journalled on a rear axle 30, which extends through upstanding bracket 32, on the chassis bottom wall 12, in line with and spaced behind the rear ends 34 of the chassis side walls 14, the latter being forwarded spaced relative to an upwardly angled rear end portion 36 of the chassis bottom wall 12.

One of the rear drive wheels 28, such as the righthand drive wheel, is provided with a reduced diameter friction wheel 38, fixed to the inner side thereof. A gas engine 40 has a further reduced diameter friction wheel 42, which is adapted to engage the friction wheel 38, at times, to drive the car C along the track T.

The gas engine 40 comprises a transverse housing 44, which is suitably fixed upon an intermediate part of a longitudinally extending, generally horizontal support bar 46, which is pivoted, at its rear end, as indicated at 48, upon the rear end portion 36 of the chassis bottom wall 12. The support bar hinged motor mount 46 has an upset portion 50, which over-rides and clears the rear axle 30, and a forwardly declining portion 52, in front of the rear axle, upon which the engine 40 is mounted.

On the side of the motor housing 44, remote from the friction wheel 42, is a vertically slidable throttle bar 54, which is pivoted, at its upper end, as indicated at 56, to the rear end of a forwardly extending link 58. The link 58 is pivoted, as indicated at 60, at its forward end, to the elevated rear end of a forwardly declining upper lever 62, of brake and throttle control linkage 64, which also includes a lower lever 66, pivoted at its rear end, to the lower end of the upper link, and pivoted, as indicated at 68, at its forward end, to the rear end of a horizontal solenoid plunger 70, which works through a solenoid coil 72, mounted upon the chassis bottom wall 12, adjacent to the forward end of the chassis.

The upper control linkage lever 62 is pivoted, intermediate its ends, as indicated at 74, on the upper end of an upstanding bracket 76, fixed, at its lower end, as indicated at 78, upon the chassis bottom wall 12, at a location spaced longitudinally between the solenoid coil 72, and the engine 40.

At a point midway between the ends of the upper linkage lever 62, the same is pivoted, as indicated at 80, to the upper end of a pendant link 82, which, at its lower end, is pivoted, as indicated at 84, to an upstanding ear 86, fixed upon the hinged support bar or motor mount 46, at the forward end thereof.

Suitably fixed beside the upstanding bracket 76, and to a side of the upper control linkage lever 62, adjacent to the lower end thereof, is a straight, rearwardly declining brake bar 88, which is located outboard of the side of the chassis C, remote from the engine's friction wheel 42.

Figure 2:
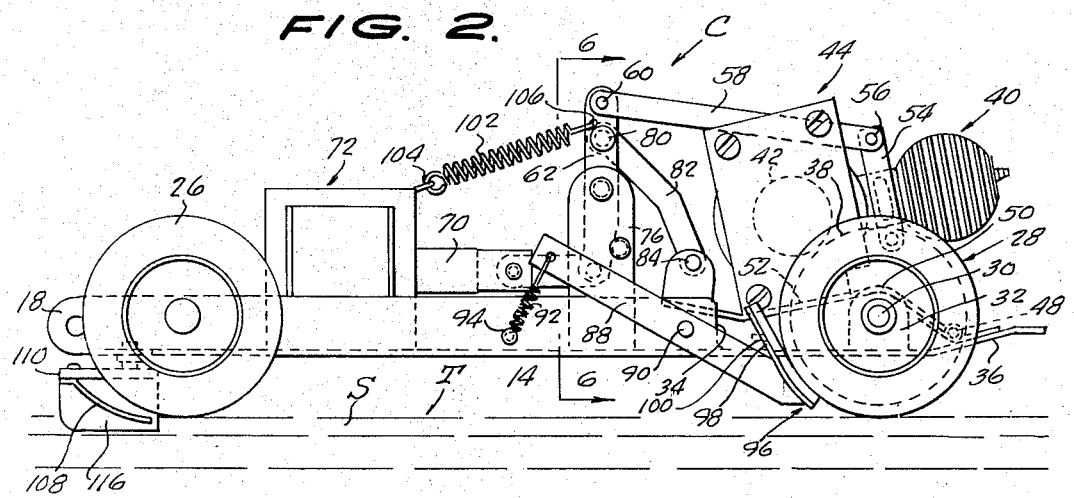
FIGURE 2 is a left hand side elevation thereof, showing the brake in applied position, and the motor in drive-disengaged position.

As shown in FIGURE 2, the brake bar 88 is pivoted, intermediate its ends, as indicated at 90, to the adjacent chassis side wall, at a point spaced between the bracket 76 and the adjacent rear drive wheel 28. A brake applying spring 92 is stretched between a point 94 on the related side wall 14, and the forward end of the brake bar 88, whereby a brake shoe 96, fixed on the rear end of the brake bar 88, is normally applied to the periphery of the related drive wheel 28, for slowing down and stopping the car C.

As shown in FIGURE 2, the brake shoe 96 has an upper, forwardly inclined portion 98, extending above the brake bar 88, to the forward side of which is affixed a lateral release pin 100. The pin 100 extends inwardly into the space between the motor mount or support bar 46 and the chassis bottom wall 12. The pin is adapted to be depressed by the motor mount 46, as it is tilted downwardly and forwardly, as indicated in FIGURE 5, whereby the brake shoe 96 is moved downwardly and forwardly away from and out of braking contact with the periphery of the related drive wheel 28, against the resistance of the brake applying spring 92.

A return spring 102, which is adapted to return the engine 40 upwardly and rearwardly to its normal position, is stretched between an eye 104, on the upper rear part of the solenoid coil, and an upper part of the upper control linkage lever 62, at a point 106, located between the upper end of the lever 62, and the pivotal connection 80 of the pendant link 82, with the lever 62.

In operation, the engine 40 being in its normal rearwardly pivoted position, as shown in FIGURE 2, the engine throttle bar 54 is in closed or substantially closed position, with the engine 40 running, and the brake 96 applied. To move the car C along the track T, the solenoid coil 72 is energized so that its plunger 70 is drawn forwardly thereinto. This produces rearward tilting of the upper lever 62 of the control linkage 64, against the resistance of the return spring 102, accompanied by forward tilting of the engine 40, release of the brake shoe 96 from the related drive wheel 28, against the resistance of the brake applying spring 92, along with the opening of the engine throttle bar 54.

External switch means (not shown) such as a pushbutton switch, connected to a source of electrical current, is connected to contact strips 106, laid upon the track T, at opposite sides of the guide slot S, with which flexible contactor shoes 108, mounted on the underside of a dielectric block 110, are engaged. The block 110 is fastened through the pivot guide eye 22, by means of a stem 117 and rotates within the guide eye 22 so as to follow any bend or curve in the slotted track, and has binding posts 112, connected by wires 114 to related ends of the solenoid coil. A fixed guide shoe 116 extends downwardly from the block 110 and is engaged in the track guide slots S.

As the solenoid coil 72 is deenergized, the return spring 102 contracts and returns the engine 40 to its rearward starting position, closes the throttle bar 54, and permits the brake applying spring 92 to apply the brake shoe 96 to the related rear drive wheel 28, for stopping or slowing the car C on the track T.

By intermittently applying electric current to the solenoid coil 72, the car C can be, besides being completely stopped, caused to move along the track C, at varying speeds.

What is claimed is:

1. A miniature racing car comprising a chassis having front track engaging wheels and rear track engaging drive wheels, a gas engine, a motor mount overlying the chassis and hinged at its rear end thereon, the engine being fixed upon the hinged mount forwardly of the pivotal point of the mount, a brake bar pivoted intermediate its ends on the chassis, brake applying spring means acting between the chassis and a forward part of the brake bar, a brake shoe on a rear part of the brake bar normally engaged with the periphery of a rear drive wheel, a solenoid coil mounted upon the chassis and having a plunger working therethrough, said chassis having pendant contactor means adapted to engage electrically charged contact means on a miniature track, said contactor means being electrically connected to the solenoid coil, and means operatively connecting the solenoid plunger with the motor mount, for tilting the motor forwardly relative to a starting position, and brake shoe releasing means operating between the motor mount and said brake shoe.

2. A miniature racing car according to claim 1, wherein said engine has a throttle bar movable between open and closed positions, said connecting means being operatively connected to the engine throttle bar.

3. A miniature racing car according to claim 1, wherein said brake releasing means comprises a lateral pin on the brake shoe extending under the hinged motor mount, said pin being adapted to be depressed by the motor mount as it is pivoted forwardly and downwardly from its starting position.

4. A miniature racing car according to claim 1, wherein said connecting means comprises bracket means upstanding on the chassis, control linkage means articulated to the bracket means, said linkage means being connected to the engine throttle bar and to the solenoid plunger.

5. A miniature racing car according to claim 1, wherein said connecting means comprises bracket means upstanding on the chassis, control linkage means articulated to the bracket means, said linkage means being connected to the engine throttle bar and to the solenoid plunger, said linkage means comprising an upper lever pivoted intermediate its ends on the bracket means, a horizontal link connected at one end to an end of the upper lever and at its other end to the throttle bar, a lower lever pivoted at one end to the other end of the upper lever and to the solenoid bar, and a pendant link pivoted at its upper end to the upper lever at a point between the pivotal connections thereto of said horizontal link and the bracket means, said pendant link being pivoted at its lower end to the hinged motor mount.

6. A miniature racing car according to claim 1, wherein said chassis has a downwardly extending guide shoe adapted to be engaged in the slot of a miniature racing track.

7. A miniature racing car according to claim 1, wherein said chassis has a downwardly extending guide shoe adapted to be engaged in the slot of a miniature racing track, an insulated block mounting the guide shoe to the chassis, said contactor means comprising flexible contactor shoe means secured to and extending downwardly from said insulated block, and means electrically connecting the contactor shoe means to the solenoid coil.

8. A miniature racing car according to claim 1, wherein at the same instant the throttle bar opens and the brake releases, the friction wheels engage the drive wheels to move the car forward, and when the solenoid is released, the throttle bar closes and the friction wheels disengage from the drive wheels at the same instant the brake is applied to decrease the speed of the car to a stop.

References Cited

UNITED STATES PATENTS

| | | | |
|---|---|---|---|
| 927,517 | 7/1909 | Fageol et al. | |
| 2,630,185 | 3/1953 | Adams | 180—19 |
| 2,687,595 | 8/1954 | McRoskey | 46—206 |

F. BARRY SHAY, *Primary Examiner.*

R. F. CUTTING, *Assistant Examiner.*